US005505536A

United States Patent [19]

Schuchardt

[11] Patent Number: 5,505,536

[45] Date of Patent: Apr. 9, 1996

[54] MULTIPLE SHAFT MIXING DEVICE PROVIDING FULL KINEMATIC SELF-CLEANING

[75] Inventor: Heinrich Schuchardt, Leverkusen, Germany

[73] Assignee: Bayer Aktiengesellschaft, Germany

[21] Appl. No.: 286,517

[22] Filed: Aug. 5, 1994

[30] Foreign Application Priority Data

Aug. 10, 1993 [DE] Germany .......................... 43 26 807.2

[51] Int. Cl.$^{6}$ ................................ B29B 7/48; B29B 7/82

[52] U.S. Cl. ............................ 366/97; 366/147; 366/300; 366/301

[58] Field of Search ................................ 366/69, 81–85, 366/96, 97, 144, 147, 149, 297–301, 309, 312, 313; 425/204, 208, 209; 99/348

[56] References Cited

U.S. PATENT DOCUMENTS

| | | | |
|---|---|---|---|
| 3,687,422 | 8/1972 | List | 366/299 X |
| 3,689,035 | 9/1972 | List | 366/85 X |
| 3,734,468 | 5/1973 | Cheng et al. | 366/300 |
| 4,556,324 | 12/1985 | Tynan | 366/301 X |
| 4,650,338 | 3/1987 | List et al. | 366/97 X |
| 4,857,632 | 8/1989 | Ahlberg et al. | 366/97 X |
| 4,883,361 | 11/1989 | Valentino et al. | 366/300 X |
| 4,941,130 | 7/1990 | List et al. | 366/313 X |
| 4,950,081 | 8/1990 | List | 366/301 X |
| 5,230,562 | 7/1993 | Nishimi et al. | 366/298 |

FOREIGN PATENT DOCUMENTS

| | | | |
|---|---|---|---|
| 734521 | 4/1943 | Germany | 366/297 |
| 605226 | 1/1985 | Japan | 366/301 |

*Primary Examiner*—Charles E. Cooley
*Attorney, Agent, or Firm*—Connolly & Hutz

[57] ABSTRACT

A multiple-shaft mixer/reactor with a large free usable volume which cleans itself kinematically consists of two or more parallel shafts (1) rotating in opposite directions, on which are mounted, helically offset, feed blades (2) which are connected to one other by axially extended kneading bars (3), and a surrounding casing (4) as well as optionally an inlet (5) and an outlet (6) for the material to be mixed.

11 Claims, 7 Drawing Sheets

MULTIPLE SHAFT MIXING DEVICE PROVIDING FULL KINEMATIC SELF-CLEANING

BACKGROUND OF THE INVENTION

The invention relates to a multiple-shaft mixer/reactor with a large free usable volume which cleans itself kinematically, consisting of two or more parallel shafts rotating in opposite directions, on which are mounted, helically offset, feed blades which are connected to one other by means of axially extended kneading bars, and a surrounding casing as well as optionally an inlet and an outlet for the material to be mixed.

The invention is geared towards devices for the treatment by process technology of fluids and cohesive bulk goods. The device is fully self-cleaning kinematically and has a large free usable volume.

In, inter alia, the manufacture and processing of synthetic materials, highly viscous liquids have to be treated by process technology. In particular, appliances are required for the purpose of mixing and evaporating. These need to bring about a good mixing action and also, in the case of evaporation, a rapid renewal of the free surfaces of the mixer.

Deposits of product on the walls of such mixers can result in the process being impaired. Undesirable side reactions in the deposits are favoured by virtue of the considerably prolonged dwell-time in the reactor. This results in contamination of the product. Product deposits on the walls can be avoided through kinematic self-cleaning of the mixer.

By way of example, mention may be made of the production of thermotropic liquid-crystal polyesters. A factor determining the speed in the final stage of polycondensation is the mass transfer of the condensate into the gas phase of the reactor, which is subject to vacuum. This requires a mass-transfer surface which is as large as possible and a renewal of the same which is as rapid as possible. By reason of the pronounced intrinsic viscosity the product has a tendency to form wall deposits in non-agitated zones. As a result of the longer dwell-times prevailing here, black cracking products arise which result, if they get into the product flow, in goods that cannot be marketed.

With a view to minimising the production and operating costs of a reactor/mixer, a large free usable volume is additionally striven for—i.e., the ratio of the volume of the stirrer unit to the volume of the casing should be as low as possible.

These requirements are to a certain extent satisfied by the apparatus described in published application DE 41 26 425 A1.

However, the apparatus described therein has two serious defects:

Only the shaft of the rotors serves to absorb bending forces, for instance in the course of mixing pasty fluids. The shaft, however, should be as thin as possible in order to obtain a large free usable volume. As a result, given the small clearances which are also striven for (on account of the self-cleaning), by reason of the deflection of the shaft it is barely possible to attain a ratio of apparatus length to shaft distance of more than 5, at best 7.

Heating of the blades and gear wheels would only be possible in the stated mixing device by means of a complicated guiding of the heating channels, whereby flow and return lines have to be guided through each tooth base. From the point of view of process technology this can be controlled only with difficulty or is associated with high costs.

SUMMARY OF THE INVENTION

It is the object of the invention to make available an apparatus which is fully self-cleaning kinematically, has a large free volume, does not exhibit the stated disadvantages and in which, preferably, a device for heating/cooling the stripping elements can be easily integrated.

The object is achieved in accordance with the invention in that in a multiple-shaft mixer feed blades are arranged, helically offset, on each shaft, said feed blades being connected to one another by means of axially extended kneading bars.

The invention provides a multiple-shaft mixer/reactor consisting of two or more parallel shafts rotating in opposite directions, on which are mounted, helically offset, feed blades which are connected to one another by means of axially extended kneading bars (the totality of interconnected shaft, feed blades and kneading bars is designated henceforth as a rotor) a surrounding casing, optionally with an inlet and an outlet for the material to be mixed and in particular with an additional vapour pipe for degasification, characterised in that the front and rear sides, viewed in the axial direction, of each feed blade of a rotor are, except at the ends of the mixer, where they clean each other with the front faces of the casing, fully cleaned kinematically by the feed blades of another rotor, each kneading bar of a rotor is fully cleaned kinematically at its ends, viewed in the axial direction, also by the feed blades, otherwise by the kneading bars and the shaft, of another rotor, each shaft of a rotor is fully cleaned kinematically by the feed blades and the kneading bars of another rotor, the casing is fully cleaned kinematically on its inner wall by the kneading bars and feed blades, the cutting edges of feed blades and kneading bars arising in a radial section of a rotor are all either arcs of a circle about the centre of rotation or epicycloid sections, the cutting edges of feed blades and kneading bars arising in a radial section of a rotor are all concave when they point inward (ie, when the normal vector on the cutting edge has a component towards the axis of rotation) and each feed blade, except at the ends of the mixer on the front and rear sides, viewed in the axial direction, is connected to a respective kneading bar, whereby the kneading bar located upstream in relation to the axial feed induced by the feed blades is connected to that end of the feed blades which leads in the course of rotation and the other one is connected to that end of the feed blades which trails in the course of rotation.

In this mixer the front and rear sides, viewed in the axial direction, of each feed blade of a rotor (except at the ends of the mixer) are fully cleaned kinematically by the feed blades of the adjacent rotors, the kneading bars of a rotor at its ends (viewed in the axial direction) also by the feed blades, otherwise by the kneading bars and the shaft, of the adjacent rotors, the shafts by the feed blades and the kneading bars of each adjacent rotor and the casing by kneading bars and feed blades.

Kinematic cleaning should be understood to mean the closest possible approach of the moving parts of the mixer which, taking account of the manufacturing tolerance, can be achieved in the course of mixing, so that the stated parts can glide past one another without jamming.

Altogether, as described, a full kinematic self-cleaning of all surfaces of the mixing chamber can be achieved.

Each feed blade, with the exception of the feed blades at the ends of the mixer, is connected on its front and rear sides to a respective kneading bar. In this regard the kneading bar situated upstream in relation to the axial feed by means of the feed blades is connected to that end of the feed blades which leads in the course of rotation and the other one to that end of the feed blades which trails in the course of rotation. Each kneading bar is connected (except at the ends of the mixer) to two respective feed blades. As a result, series of feed blades arise which are connected by means of kneading bars extending over the entire length of the mixer.

These series of feed blades connected by means of kneading bars substantially absorb the bending forces of the rotor arising as a result of deflection.

Corresponding to their arrangement on the periphery of the rotor, a maximal area moment of inertia and thereby a minimal deflection of the shafts is achieved.

The edges of the rotors arising in a radial section can be described mathematically:

Let 1 and 11 be two rotors with angular velocities $\omega_1$ and $\omega_{11}$ and midpoint $$\begin{pmatrix} 0 \\ 0 \end{pmatrix}$$

and $$\begin{pmatrix} a \\ 0 \end{pmatrix}$$

. Then the motion of a point $$\begin{pmatrix} x_1 \\ y_1 \end{pmatrix}$$

of the rotor 1 in the coordinate system of the rotor 11 can be described by the following:

$$\begin{pmatrix} x_{11} \\ y_{11} \end{pmatrix} = \begin{pmatrix} \cos(\omega_{11}*t) & \sin(\omega_{11}*t) \\ -\sin(\omega_{11}*t) & \cos(\omega_{11}*t) \end{pmatrix} * \left( \begin{pmatrix} \cos(\omega_1*t) & -\sin(\omega_1*t) \\ \sin(\omega_1*t) & \cos(\omega_1*t) \end{pmatrix} * \begin{pmatrix} x_1 \\ y_1 \end{pmatrix} + \begin{pmatrix} a \\ 0 \end{pmatrix} \right)$$

In a preferred embodiment the rotors rotate at an equal speed in terms of magnitude. Here, $\omega_1=\omega_{11}$.

One aim in kinematic cleaning is to achieve a clearance of the moving parts which is as small as possible. This can be achieved if the torsion angle of all rotors over the whole length has the same magnitude—that is, the torques are also the same. This is made possible with a preferred embodiment of the invention in that the rotors are equipped with identical, repeating elements. In the case of rotation at an equal speed in opposite directions this results in the angular pitches between each of the adjacent kneading bars of a rotor being determined by the equation:

$$\phi = \frac{2\pi - 2m\psi}{n}$$

where n is the number of threads, m is the degree of rotational symmetry, $\phi$ is an angular pitch between adjacent kneading bars, $\pi$ is the number 3.14159 . . . ($\pi$) and $\psi$ is the offset between kneading bars on the front and rear sides of a feed blade.

So as to avoid giving rise to oscillation, a torque that is constant over time is also striven for. This is achieved in a particularly preferred embodiment in that, with a view to making the drive moment uniform, the offset between the kneading bars on the front and rear sides of a feed blade ($\psi$) is not an integral multiple of the angular pitch between two adjacent kneading bars ($\phi$). The offset between kneading bars on the front and rear sides of a blade is the angle by which a kneading bar has to be rotated about the axis of rotation of the connected shaft so that its imagined axial extension is precisely aligned with the kneading bar.

The angular pitch between two kneading bars is the angle by which one kneading bar has to be rotated about the axis of rotation of the connected shaft so that it comes to coincide with the other kneading bar.

In the case that the mixer length is an integral multiple of the axial distance between two feed blades connected by means of kneading bars then the following should apply with respect to the preferred embodiment of the reactor/mixer:

$$\psi = \frac{i}{o}\,\phi$$

$$o = \frac{l_\Sigma}{l_i}$$

where $\phi$ is the angular pitch between two adjacent kneading bars, i is an integer not equal to 0 without a common divisor with o, $l_1$ is the axial distance between two feed blades connected by means of kneading bars, $l_\Sigma$ is the length of the mixer and $\psi$ is the offset angle between kneading bars on the front and rear sides of a feed blade.

With systems rotating at various speeds the requirement for torsion ratios that are as constant as possible leads to the formulation that the degree of rotational symmetry is inversely proportional to the magnitude of the angular velocity of the shafts.

A comprehensive heating or cooling of the rotors, feed blades and kneading bars is possible in a preferred embodiment of the invention if the heating/cooling medium is conducted through an end of a shaft, each partial flow of the medium is conducted to the succeeding kneading bar through the respective first feed blade of a series of kneading bars and feed blades which are connected to one another, following the series of kneading bars and feed blades over the entire length of the rotor, through the respective last feed blade back to the shaft and from there through the end of the shaft opposite the inlet, while an additional partial flow of the heating/cooling medium is conducted through a longitudinal bore of the shaft in order also to heat or to cool the shaft. In this connection, in contrast to the apparatus described in DE 41 26 425 A1, no places occur where flow and return lines of the heating medium have both to be conducted through a foot of a feed blade or through a tooth base. The production is correspondingly simple to control from the point of view of manufacturing engineering.

BRIEF DESCRIPTION OF THE DRAWINGS

The invention is described in greater detail below on the basis of an example and with reference to the attached drawings.

DETAILED DESCRIPTION OF THE INVENTION

EXAMPLE

Figure 1C:
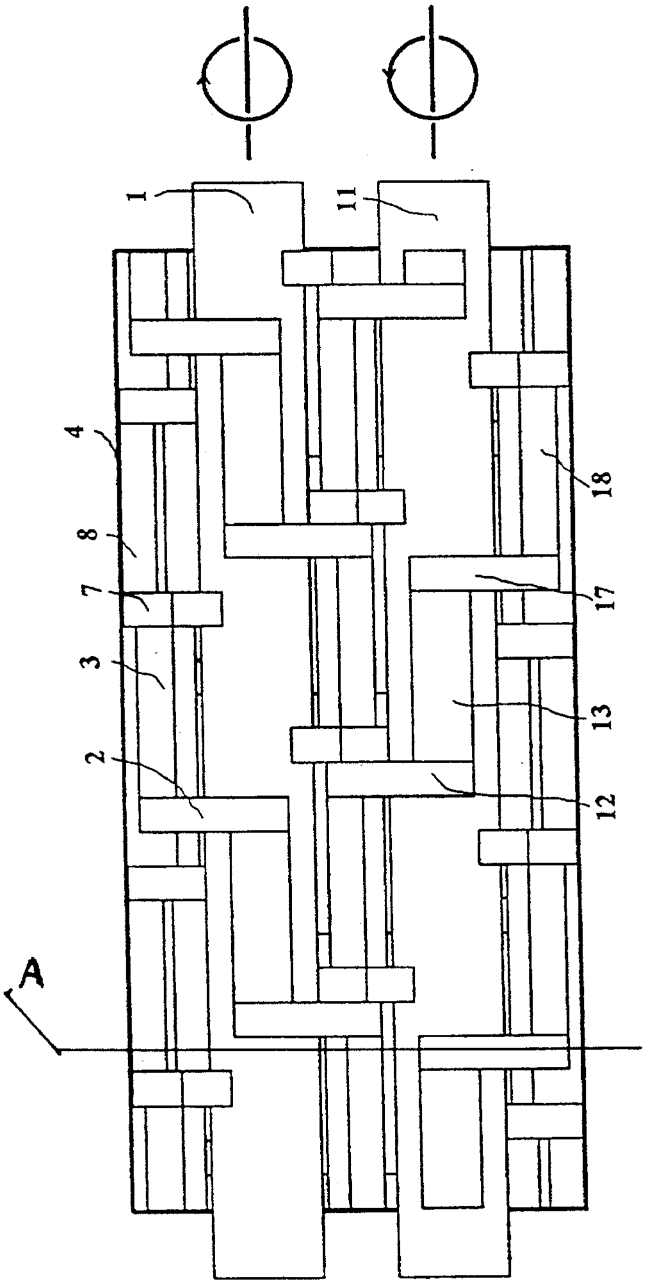
FIG. 1 shows the representation of the principal structure of a mixer according to the invention in sectional drawings in sectional front view (FIG. 1*b*), bottom view (FIG. 1*c*) and side view (FIG. 1*a*).
Figure 1B:
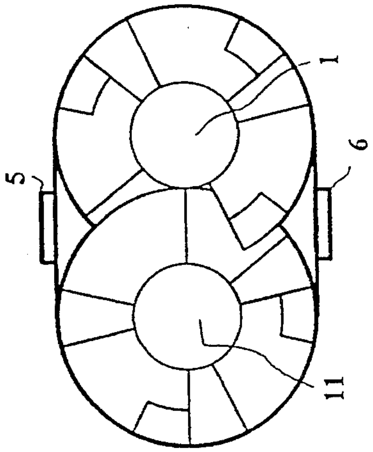
Figure 1A:
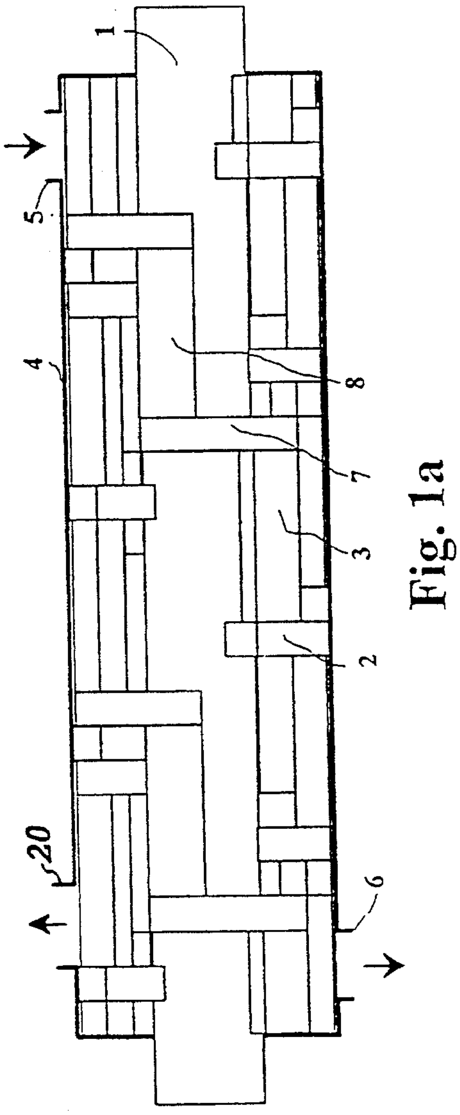

In FIG. 1 the principal structure of a mixer according to the invention is shown. In a casing 4 there are located two shafts 1, 11. On each of these there are connected, in accordance with a simple helix, feed blades 2, 7, 12, 17. The representation in FIG. 1 has been simplified in that the edges arising in a radial section are not epicycloids and the mixer represented is also not fully self-cleaning. FIG. 1*a* shows a casing 4 with an inlet 5 for the material to be mixed and an outlet 6 for the mixed material. FIG. 1*a* also shows a vapor pipe 20 for removing vapor from the mixer.

Figure 2:
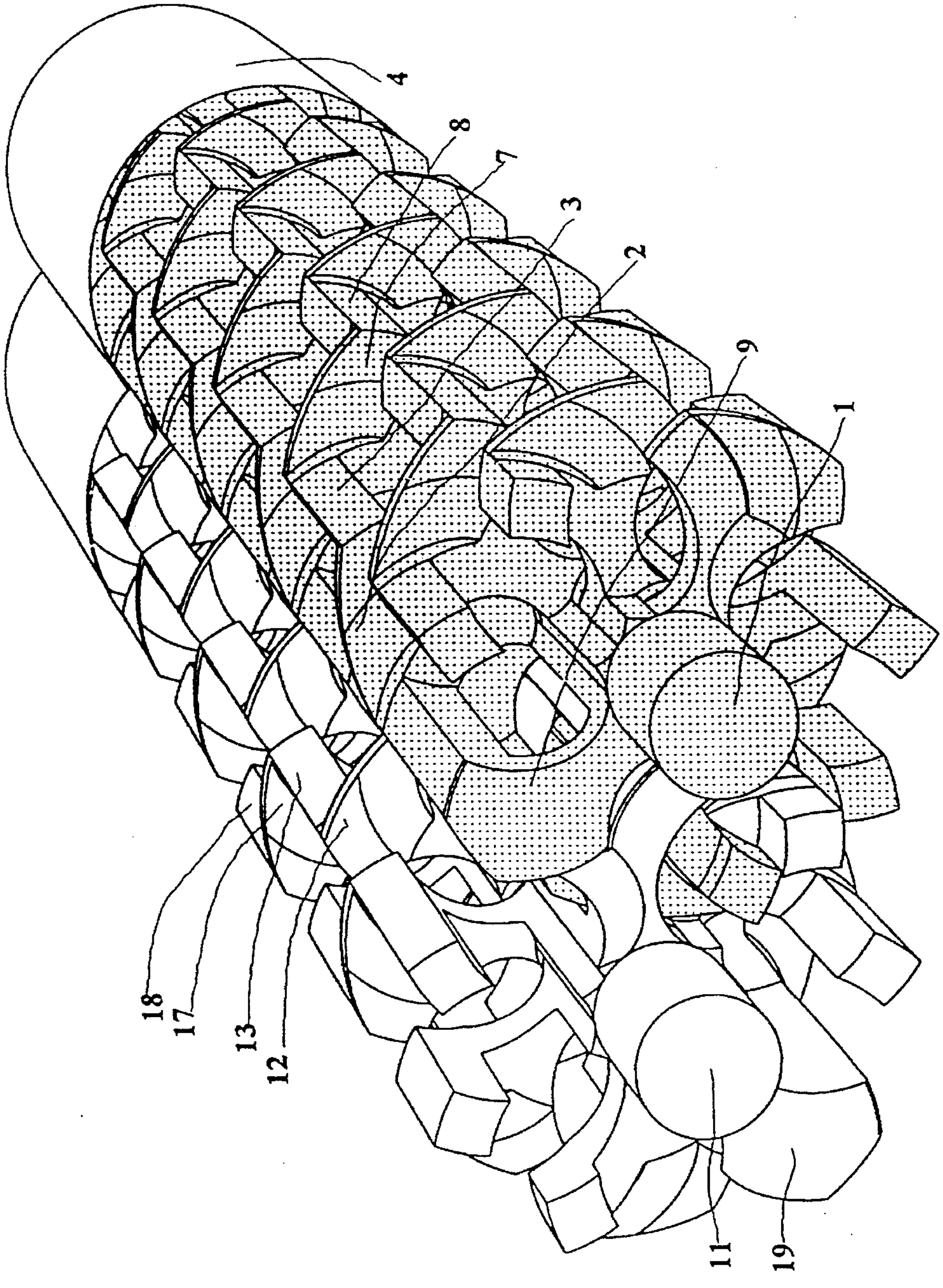
FIG. 2 shows the representation of a mixer according to the invention.

FIG. 2 shows the spatial representation of a mixer according to the invention. The casing is only represented in part. On each shaft there are arranged, in accordance with a double helix, feed blades 2, 7, 12, 17. The front and rear sides of the feed blades do not lie, as in FIG. 1, in planes perpendicular to the axes of rotation, rather the feed blades are so arranged that they contribute in increased measure to the axial transport. The feed blades are connected by means of the kneading bars 3, 13, 8, 18 on each shaft to form 7 series of alternating kneading bars and feed blades. The mixer is designed for rotation of equal magnitude in opposite directions.

The free usable volume amounts to 68.5% of the internal volume of the casing.

Figure 3:
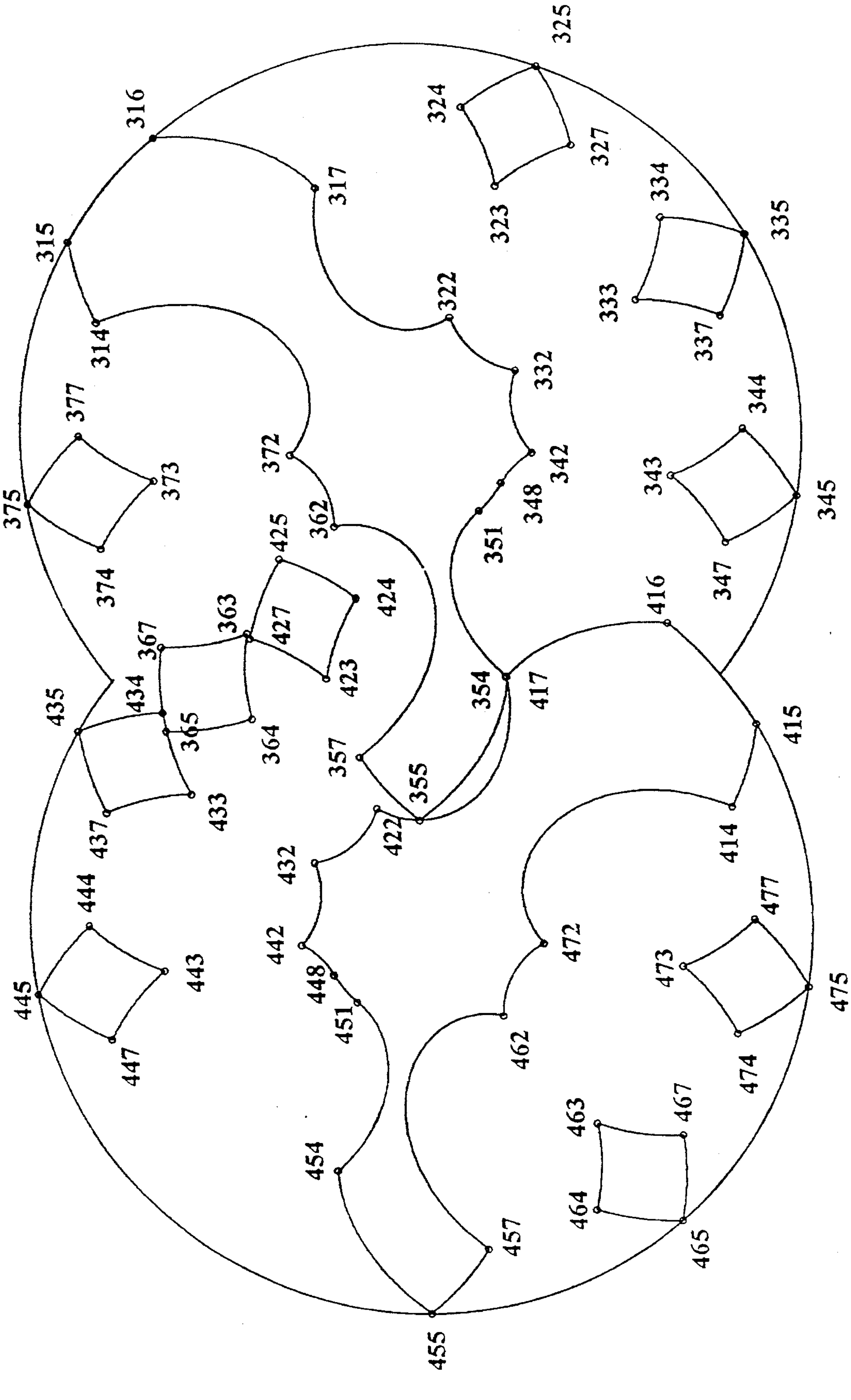
FIG. 3 shows the representation of a radial section through the mixer according to FIG. 2 as it also appears as the front face of the mixer.
Figure 4A:
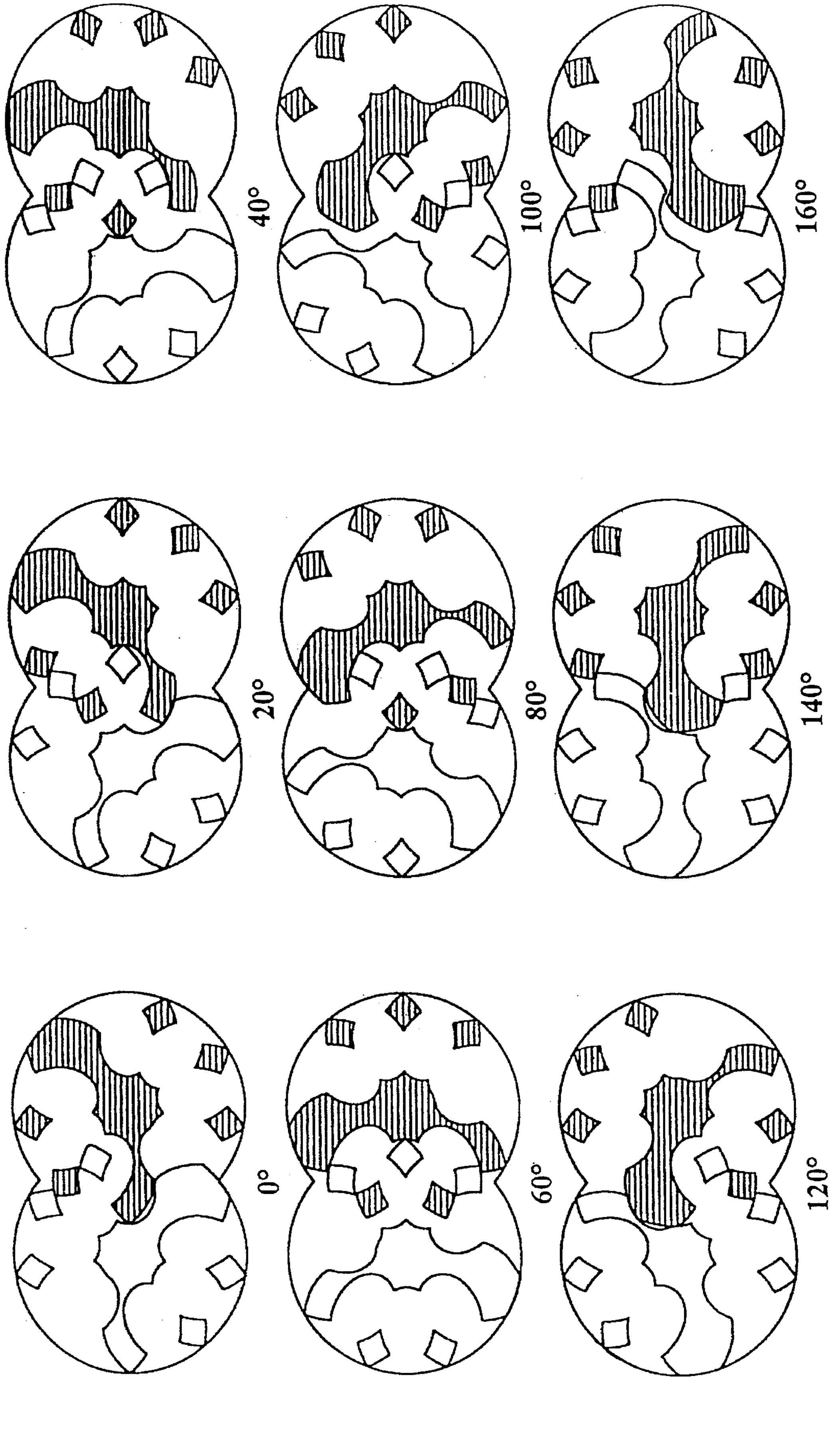
FIGS. 4*a* and 4*b* show the representation of the rotary motion in a radial section corresponding to FIG. 3, in 18 snapshots.
Figure 4B:
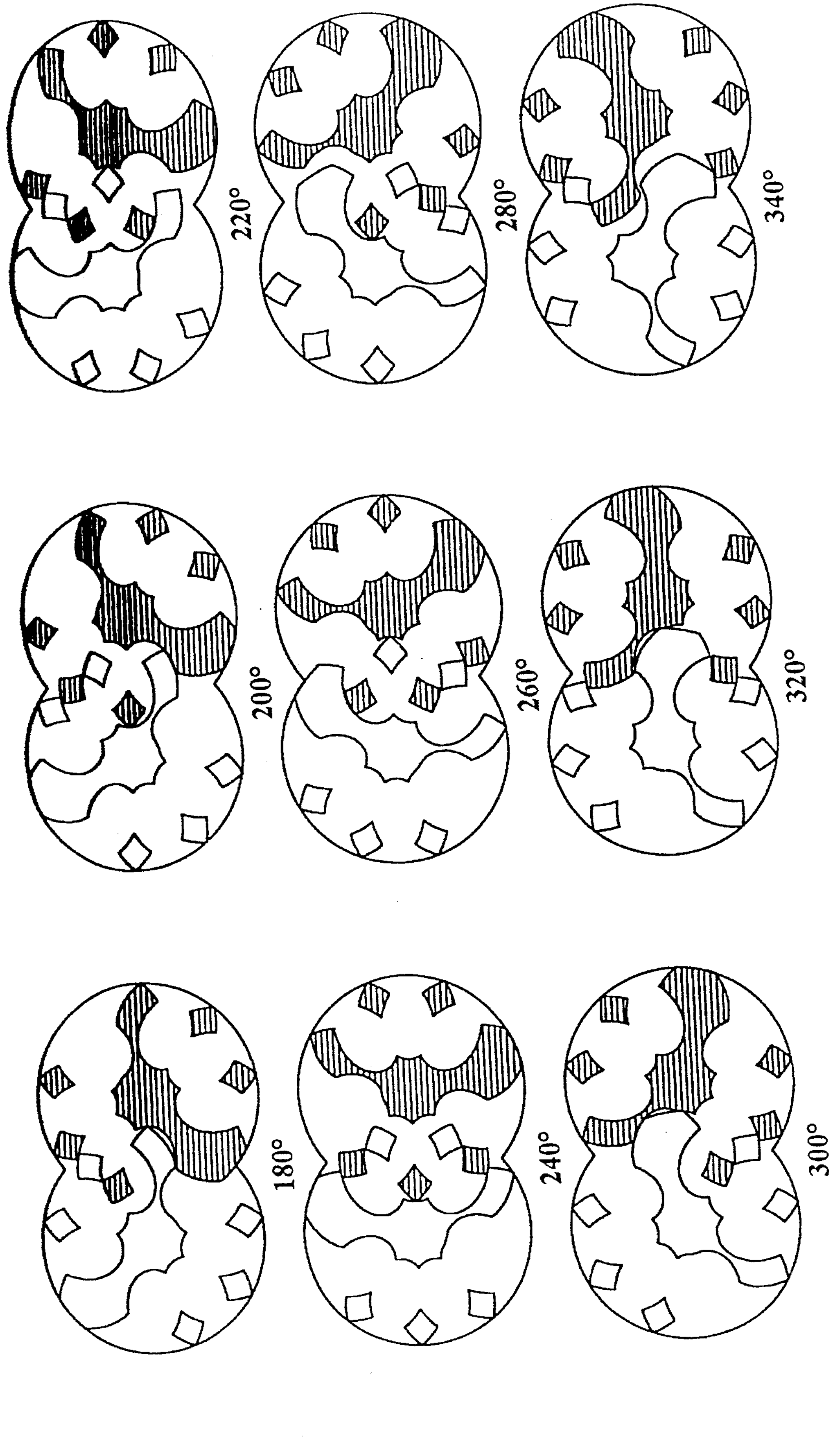

FIG. 3 shows a radial section corresponding to A in FIG. 1*c* through the mixer according to FIG. 2, this section being shown also on the front face of the mixer in FIG. 2. Hence kneading bar 9 from FIG. 2 appears as a series of continuous lines 414, 415, 416, 417 and stripper 19 as 314, 315, 316, 317 in FIG. 3. In FIG. 4*a* and FIG. 4*b* the same radial section is shown in 18 temporally successive phase patterns in the course of one complete revolution of the shafts. In this connection the cleaning action becomes clear:

| | |
|---|---|
| edge 314 cleans surface 445–447, | edge 414 cleans surface 345–347, |
| edge 324 cleans surface 455–457, | edge 424 cleans surface 355–357, |
| edge 334 cleans surface 465–467, | edge 434 cleans surface 365–367, |
| edge 344 cleans surface 475–477, | edge 444 cleans surface 375–377, |
| edge 354 cleans surface 416–417, | edge 454 cleans surface 316–317, |
| edge 364 cleans surface 425–427, | edge 464 cleans surface 325–327, |
| edge 374 cleans surface 435–437, | edge 474 cleans surface 335–337, |
| edge 315 cleans surface 443–447, | edge 415 cleans surface 343–347, |
| edge 315 cleans surface 442–448, | edge 415 cleans surface 342–348, |
| edge 325 cleans surface 457–462, | edge 425 cleans surface 357–362, |
| edge 325 cleans surface 463–464, | edge 425 cleans surface 363–364, |
| edge 335 cleans surface 462–472, | edge 435 cleans surface 362–372, |
| edge 335 cleans surface 463–467, | edge 435 cleans surface 363–367, |
| edge 335 cleans surface 473–474, | edge 435 cleans surface 373–374, |
| edge 345 cleans surface 414–472, | edge 445 cleans surface 314–372, |
| edge 345 cleans surface 473–474, | edge 445 cleans surface 373–374, |
| edge 355 cleans surface 422–417, | edge 455 cleans surface 322–317, |
| edge 355 cleans surface 423–424, | edge 455 cleans surface 323–324, |
| edge 365 cleans surface 423–427, | edge 465 cleans surface 323–327, |
| edge 365 cleans surface 432–442, | edge 465 cleans surface 332–342, |
| edge 365 cleans surface 433–434, | edge 465 cleans surface 333–334, |
| edge 375 cleans surface 432–442, | edge 475 cleans surface 332–342, |
| edge 375 cleans surface 433–437, | edge 475 cleans surface 333–337, |
| edge 375 cleans surface 443–444, | edge 475 cleans surface 343–344, |
| edge 316 cleans surface 451–454, | edge 416 cleans surface 351–354, |
| edge 317 cleans surface 454–455, | edge 417 cleans surface 354–355, |
| edge 327 cleans surface 464–465, | edge 427 cleans surface 364–365, |
| edge 337 cleans surface 474–475, | edge 437 cleans surface 374–375, |
| edge 347 cleans surface 414–415, | edge 447 cleans surface 314–315, |
| edge 357 cleans surface 424–425, | edge 457 cleans surface 324–325, |
| edge 367 cleans surface 434–435, | edge 467 cleans surface 334–335, |
| edge 377 cleans surface 444–445, | edge 477 cleans surface 344–345, |
| surface 351–316 cleans surface 448–451, | surface 451–416 cleans surface 348–351. |

As can be seen, all peripheral surfaces are cleaned.

Likewise it becomes clear that the inner walls of the casing are cleaned by the edges 445, 435, 345, 335.

The front faces of the casing are, e.g., fully cleaned by edges of the blades 9, 19 that are situated on the ends.

Figure 5:
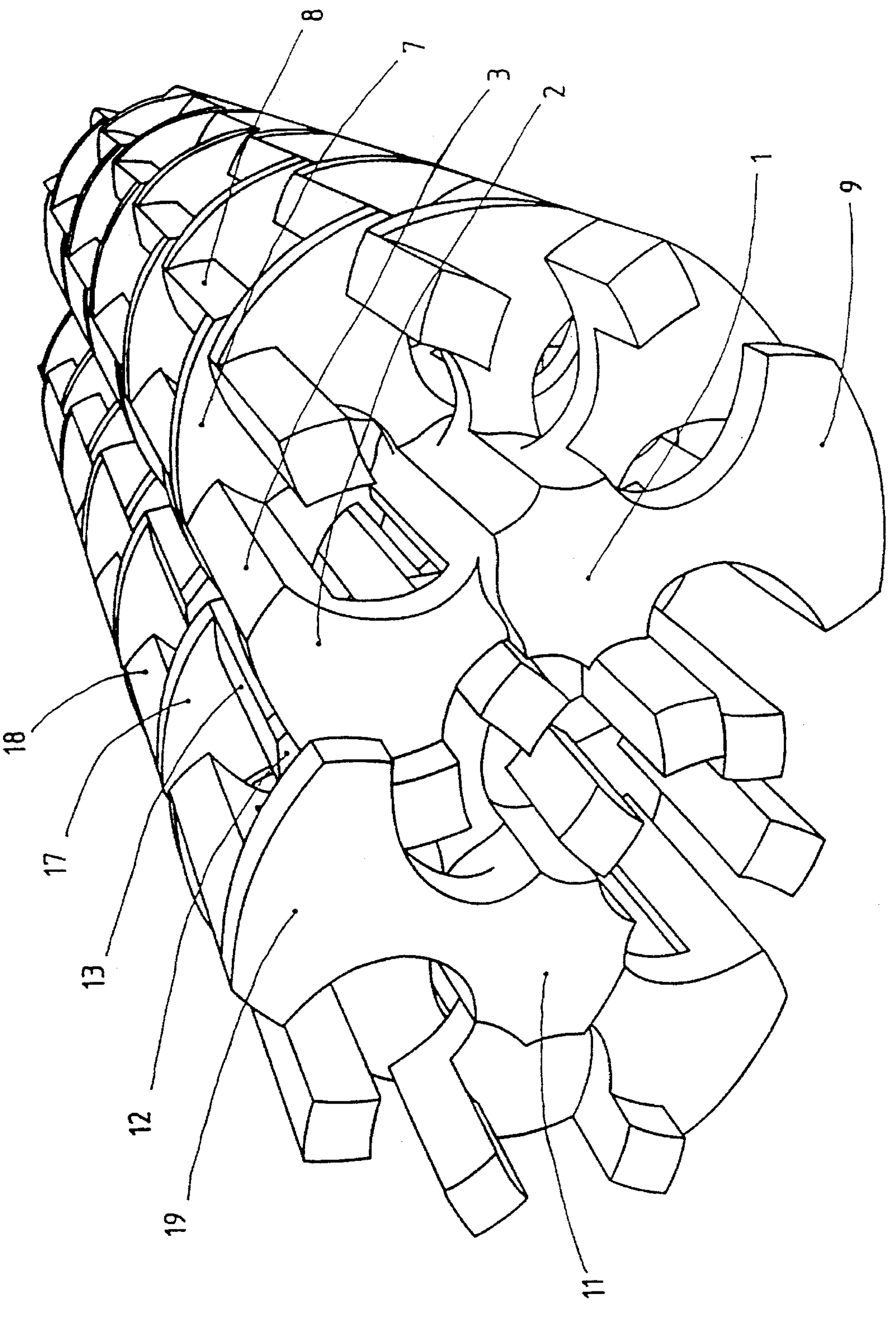
FIG. 5 shows a further preferred embodiment of the mixer according to the invention.

A further preferred embodiment of the mixer according to the invention is shown in FIG. 5. This differs from the mixer of FIG. 2 in particular by the fact that feed blades 2, 12, 7, 9, 17, 19, are in the form of flat discs, whose front and rear sides are arranged at right angle to the rotating axes 1 and 11. One advantage of this preferred mixer is its simple technical design obtainable by a simpler method of construction.

The feed blades and the kneading bars are prism-shaped and therefore can be produced easily, e.g., by milling.

Figure 6:
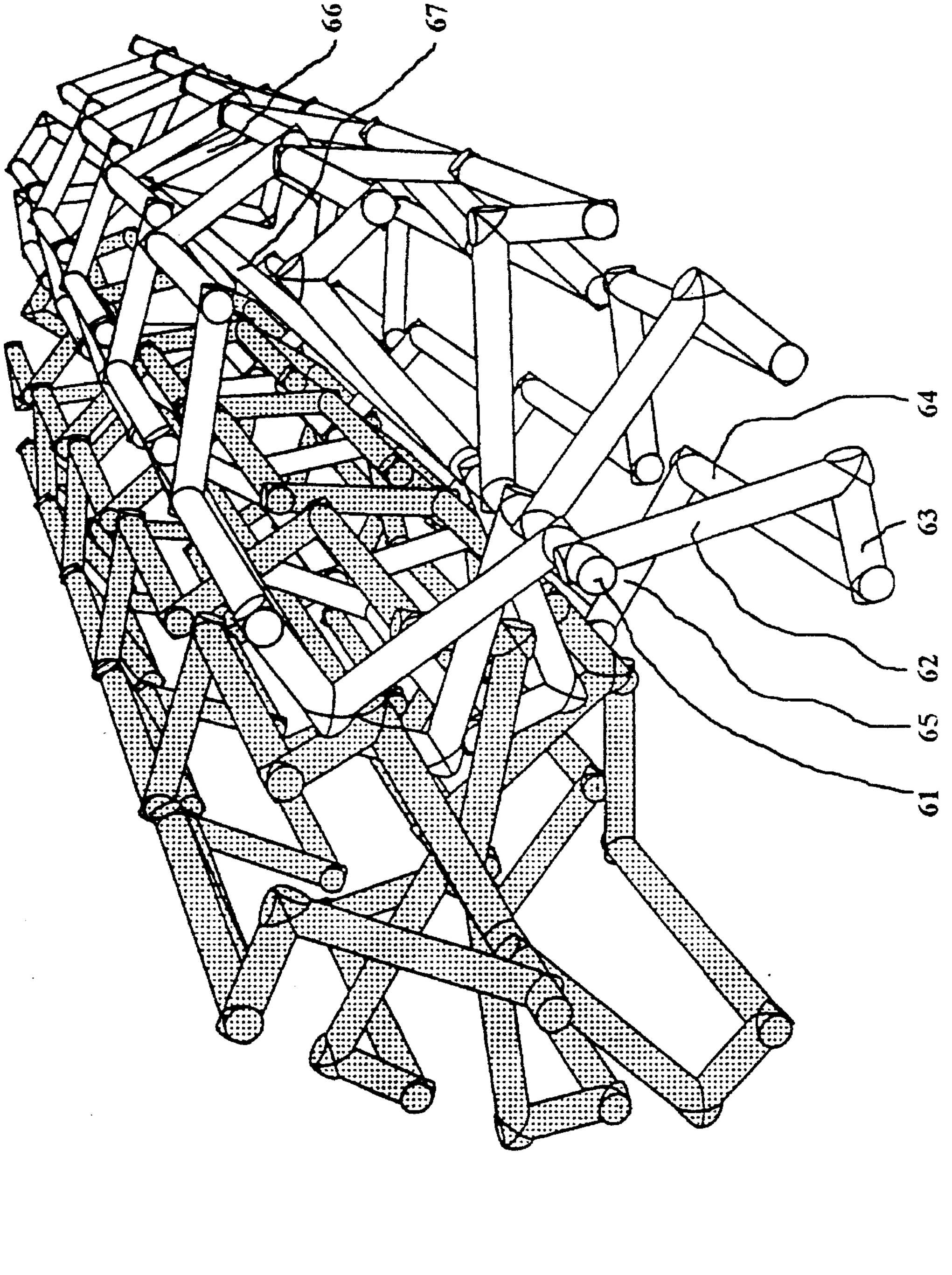
FIG. 6 shows the heating and cooling of the rotors, feeding blades and kneading bars.

FIG. 6 shows the arrangement of internal bores for heating or cooling of the shafts, feed blades, and kneading bars of the mixer shown in FIG. 5. The feed of the heating/cooling medium enters the shaft at 61 and is conducted to the respective first feed blade of a series of feed blades and kneading bars which are connected to one another through which the heating/cooling medium is lead by internal bores 62, 63. The heating (or cooling) medium is conducted by bore 64 through the adjacent kneading bar, by bore 65 through the next feed blade and so on until by means of bore 66 and the last feed blade of the series of feed blades and kneading bars, it is returned to the shaft, where it joins the partial flow which by means of bore 67 heats the shaft of the mixer and the partial flows through the other series of feed blades and kneading bars.

The invention claimed is:

1. A multiple shaft mixing device providing full kinematic self cleaning comprising at least two parallel rotors mounted for rotation in opposite directions, said rotors having shafts with helically offset feed blades, said feed blades having faces and being connected to one another by kneading bars extending in the direction of the shafts, and a casing with longitudinal ends having an inner wall and side walls at both longitudinal ends thereof, wherein in motion the faces of said feed blades facing the side walls of the casing and the shaft are contacted by the feed blades of one of the other shafts and cleaned kinematically, the kneading bars are contacted and cleaned kinematically by the feed blades and the kneading bars of at least one shaft of one of the other rotors, and the shaft of each rotor is contacted and cleaned by the feed blades and the kneading bars of at least one of the other rotors, the casing inner wall is contacted by at least one of the kneading bars and one of the feed blades and is cleaned kinematically, the feed blades and the kneading bars having concave shape cross section when facing inward toward the axis of rotation of the rotors.

2. A mixer as claimed in claim 1, wherein the rotors are mounted and motivated to rotate at the same speed.

3. A mixer as claimed in claim 1, wherein the rotors have the same number n of series of feed blades.

4. A mixer as claimed in claim 3, wherein an angular pitch between two adjacent kneading bars is determined by the equation:

$$\phi = \frac{2\pi - 2m\psi}{n}$$

where $\phi$ is the angular pitch between two adjacent kneading bars, n is the number of series of feed blades, m is the degree of rotational symmetry, $\psi$ is an offset angle between the kneading bars in the front sides and rear sides of a feed blade, and $\sigma$ is the number $\sigma$, 3.14159.

5. A mixer as claimed in claim 4, wherein the offset angle between the kneading bars on the front and rear sides of the feed blade is not an integral multiple of the angular pitch between two adjacent kneading bars.

6. A mixer as claimed in claim 1 wherein an axial distance exists between two feed blades connected by means of the kneading bars, and the mixer has a length which is an integral multiple of the axial distance.

7. A mixer as claimed in claim 6, wherein $$\psi = \frac{i}{o}\,\phi$$

$$o = \frac{1_{\Sigma}}{1_i}$$

where $\phi$=an angular pitch between adjacent kneading bars, i =an integer not equal to 0 without a common divisor with o, $1_i$=the axial distance between two feed blades connected by kneading bars, $1_{\Sigma}$=the length of the mixer, and $\psi$=an offset angle between kneading bars on the front and rear sides of a feed blade.

8. A mixer as claimed in claim 1 including a bore through the feed blades, kneading bars, and rotors, and a heating medium flowing through the bore.

9. A mixer as claimed in claim 1, further comprising a vapor pipe connected to the casing for removing gaseous vapor.

10. A mixer as claimed in claim 1, wherein the casing includes an inlet for material to be mixed and an outlet for mixed material.

11. A mixer as claimed in claim 1, including a bore through the feed blades, kneading bars, and rotors, and a cooling medium flowing through the bore.

* * * * *

UNITED STATES PATENT AND TRADEMARK OFFICE

CERTIFICATE OF CORRECTION

PATENT NO. : 5,505,536

DATED : April 9, 1996

INVENTOR(S) : Heinrich Schuchardt

It is certified that error appears in the above-indentified patent and that said Letters Patent is hereby corrected as shown below:

Column 38, line 45, "$\omega_1 = \omega_{11}$" should read -- $\omega_1 = -\omega_{11}$ --.

Column 8, line 13 (claim 4, last line ), "$\sigma$ is the number $\sigma$,3.14159" should read -- $\pi$ is the number $\pi$, 3.14159 --.

Signed and Sealed this

Thirtieth Day of July, 1996

*Attest:*

BRUCE LEHMAN

*Attesting Officer*

*Commissioner of Patents and Trademarks*